United States Patent

[11] 3,633,181

[72] Inventor Michael F. Sikorsky
Neptune City, N.J.

[21] Appl. No. 887,517
[22] Filed Dec. 23, 1969
[45] Patented Jan. 4, 1972
[73] Assignee Bell Telephone Laboratories, Incorporated
Murray Hill, Berkeley Heights, N.J.

[54] MULTIPLE TIMING LIST ARRANGEMENT
7 Claims, 7 Drawing Figs.

[52] U.S. Cl. 340/172.5
[51] Int. Cl. G06f 7/02, G06f 9/18, G06f 15/46
[50] Field of Search 340/172.5; 235/151.3

[56] References Cited

OTHER REFERENCES

The Bell System Technical Journal, Volume 43. number 5, September 1964, TKl.B435, by American Telephone and Telegraph Company, pp. 1850– 1891 and 1926– 1959.

*Primary Examiner*—Raulfe B. Zache
*Assistant Examiner*—Jan E. Rhoads
*Attorneys*—R. J. Guenther and James Warren Falk

ABSTRACT: A program controlled timing arrangement for service circuit registers in a real-time processing system is disclosed. Sixty timing lists and a modulo-60 counter for indexing the lists are provided. At 1-second intervals the registers on the list presently indexed by the counter are examined for timeout and the counter is incremented. A register requiring timing is placed on a list in accordance with the required time interval and the calculated value of the counter at the termination of this interval. Facilities are also provided for interrupting and reinitiating timing without loss of unelapsed time.

INVENTOR
M. F. SIKORSKY
BY Frederick W. Padden
ATTORNEY

PLACE REGISTER ON LIST FOR PERIOD OF "M" MINUTES PLUS "S" SECONDS

REMOVE REGISTER FROM LIST
AND SAVE UNELAPSED TIME

MULTIPLE TIMING LIST ARRANGEMENT

BACKGROUND OF THE INVENTION

This invention relates to memory control facilities within a real-time processing system controlled by a stored program processor and, more particularly, to a method for providing accurate general purpose timing facilities in the processor memory.

In a real-time processing system, such as a telephone-switching system, it is often necessary to time intervals during which system service circuits are engaged in performing their respective functions. Illustratively, on calls from a coin telephone, 3-minute initial period timing is required for coin trunks so that an operator may notify the calling party and collect charges for additional talking periods. In prior art manual switching systems, operators were required to examine mechanical clocks to determine when this initial period had elapsed. Later, the coin trunks in electromechanical systems were equipped with automatic timers which cause lights to flash at the end of the initial period, thereby notifying the operator of the elapsed time.

With the advent of electronic switching systems controlled by stored program processors, new techniques were developed for administering calls. In such systems, service circuit registers are provided in an administrative area of a processor scratch pad memory for storing data needed by the processor to administer tasks involving the particular service circuits associated with these registers. Circuit timing is accomplished through the use of timing lists on which the registers may be placed by different task programs requiring timing. Such a task program may be, for example, a program which causes the operator to be notified when the 3-minute initial talking period for a coin trunk has elapsed. The registers on the timing lists are examined at regular intervals and a portion of each register is used to store timing data corresponding to the number of times each register is to be examined before the task program is to be notified. A more detailed description of the use of timing lists is found on pages 1,950 through 1,952 of the *Bell System Technical Journal*, Volume XLIII, Number 5, Part 1, Sept. 1964.

This approach leads to several problems. If the registers on a timing list are examined every second and a register is placed on a timing list for a period of up to several minutes, it is readily apparent that the register would be examined many times before the required time interval elapsed. This consumes excessive processing time and consequently reduces real-time processing capability. It would therefore appear advantageous to provide a timing list with an examination interval greater than 1 second, for example, 1 minute. However, this results in a margin of error of the full timing interval because a register could be placed on the 1-minute list at any instant between the 1-minute spaced examinations. This situation is intolerable for timing functions which require accurate long period timing, such as the timing of coin calls. Moreover, there are other timing functions which require smaller timing intervals; for example, a 10-second grace period after a 3-minute initial charging period has elapsed within which a customer may hang up without being charged for an additional talking period. If different types of timing lists were provided for all the required timing increments, that is, for example, providing a 1-second timing list, a 10-second timing list, and a 1-minute timing list, the executive control program of the switching system would be required to keep track of which timing list was to be processed at any particular time. This arrangement also is wasteful of valuable real-time processing capability.

It is therefore apparent that a need exists for an arrangement whereby general purpose timing may be accurately performed for different timing intervals without overburdening real-time processor capacities.

SUMMARY OF THE INVENTION

An important aspect of my invention which departs from the prior art is that an executive control program in a processor need only activate a single timing program in order to perform general purpose timing for many different timing intervals. Furthermore, accurate long-period timing is accomplished without burdening the real-time processing capacity of the processor.

I advantageously provide a method implemented by program steps for controlling apparatus in a real-time processing system to time system operations. A memory of the system includes a plurality of timing lists and a pointer for identifying each of the lists one at a time. My inventive method is implemented by the successive steps of examining the pointer at predetermined intervals to determine each identified one of the lists, processing the determined list to recognize timing conditions of the system operations, and altering the pointer for identifying a succeeding one of the lists.

According to the illustrative embodiment, a block of processor scratch pad memory locations is set aside and divided into segments called "head cells" which are accessible during executive, task, insertion, and timing program operations. The memory block is referred to as a "head cell table" and each head cell defines a timing list comprising service circuit registers for which timing operations are currently being performed. The head cells identify the first and last registers on their respective lists if there are registers on the lists and if there are no registers on a particular list, the head cell for that list is set to some predetermined pattern of bits. Each register, during a service circuit timing operation, is linked to an appropriate list by providing in the register an identification of the immediately preceding and succeeding registers on that list. This linking arrangement enables the processor conveniently to examine successively each register on that list. The above-described arrangement is referred to as a "two-way linked list", as described in the aforementioned *Bell System Technical Journal* article on page 1,952, and advantageously facilitates removals of registers from a list in a manner as known in the art.

A salient feature of my invention which further departs from the prior art is the provision of a word called "present pointer" in the scratch pad memory, which pointer advantageously indexes the head cell table. The contents of the present pointer word specifies the head cell of the timing list which will be processed next and is regularly changed at prescribed time intervals to "point" to different head cells in a predetermined sequence.

When the executive system control program engages a task program and the latter determines that a service circuit requires timing for an interval equal to a number of timing list examination intervals, the task program stores timing interval and time-out return address data in the service circuit register. The timing interval data enables an insertion program to place that service circuit register on an appropriate timing list. The time-out return address data is utilized for returning system control to the task program after the termination of the required time interval.

A service circuit register is placed on an appropriate timing list by the task program engaging an insertion program. The latter, upon assuming control, examines the present pointer and then links the service circuit register to the appropriate list. The list may be that determined by the head cell indexed by the present pointer if the required timing interval is equal to an integral number of timing list examination intervals. If the required interval is not an integral number of timing list examination intervals, the insertion program utilizes the time interval data and the instantaneous contents of the present pointer word to calculate the contents of the present pointer word at the termination of the required time interval. The service circuit register is then linked to the list defined by the head cell indexed by this calculated value of the contents of the present pointer word.

In accordance with the present invention, a timing program is provided in the processor and it functions to examine registers which have been placed on timing lists by different task programs of the system and to determine whether the time period requested by the task program has elapsed. At regular intervals, the executive control program activates the timing program which examines the present pointer to determine which head cell defines the timing list to be processed at that time. The timing program then examines the timing data in each register on that list. The timing data corresponds to remaining time, so that if the data indicates that no time remains, the timing program temporarily transfers control to the instruction at the timeout return address stored in the register. If time still remains for a register, the timing program decrements the timing data stored in that register. After examining all the registers on the list, the timing program alters the present pointer so that it indexes a different head cell. This alteration is done in a predetermined manner so that the timing lists are sequentially processed.

Illustratively, if there are 60 head cells and the timing program is activated at 1-second intervals, each timing list is processed at 1-minute intervals. The present pointer becomes, in effect, a modulo-60 counter. Therefore, if a task program desires to time a service circuit for three minutes, the service circuit register is placed on the list defined by the head cell indexed by the present pointer. The number "3" is stored in the timing data portion of the register. Shortly thereafter, within 1 second, the timing program will process that timing list and examine that register. The timing data will be decremented to "2". One minute later the timing program will again examine that register and decrement the timing data to "1". One minute after that, the timing data will be decremented to "0", and one minute after that, or a total of three minutes after the register was placed on the list, the timing program will remove the register from the list and transfer control to the instruction at the timeout return address stored in the register by the task program. Timing accuracy is determined by the maximum interval between the time a register is put on a timing list and the time at which the timing program is next activated. Therefore, the above-described 3-minute timing is accurate to within 1 second.

This invention also provides the capability of allowing a register to be removed from a timing list with time still remaining and to be placed back on a timing list after a nontimed interval in such a manner that the previous remaining time is utilized as the initial time. This feature is particularly useful in the timing of a coin call when an operator is engaged on the call and it is necessary to give the customer the remaining portion of the full timing interval for which he is charged.

DESCRIPTION OF THE DRAWING

The foregoing inventive contributions will be more readily understood upon a reading of the following description in conjunction with the drawing in which.

GENERAL DESCRIPTION

Figure 1:
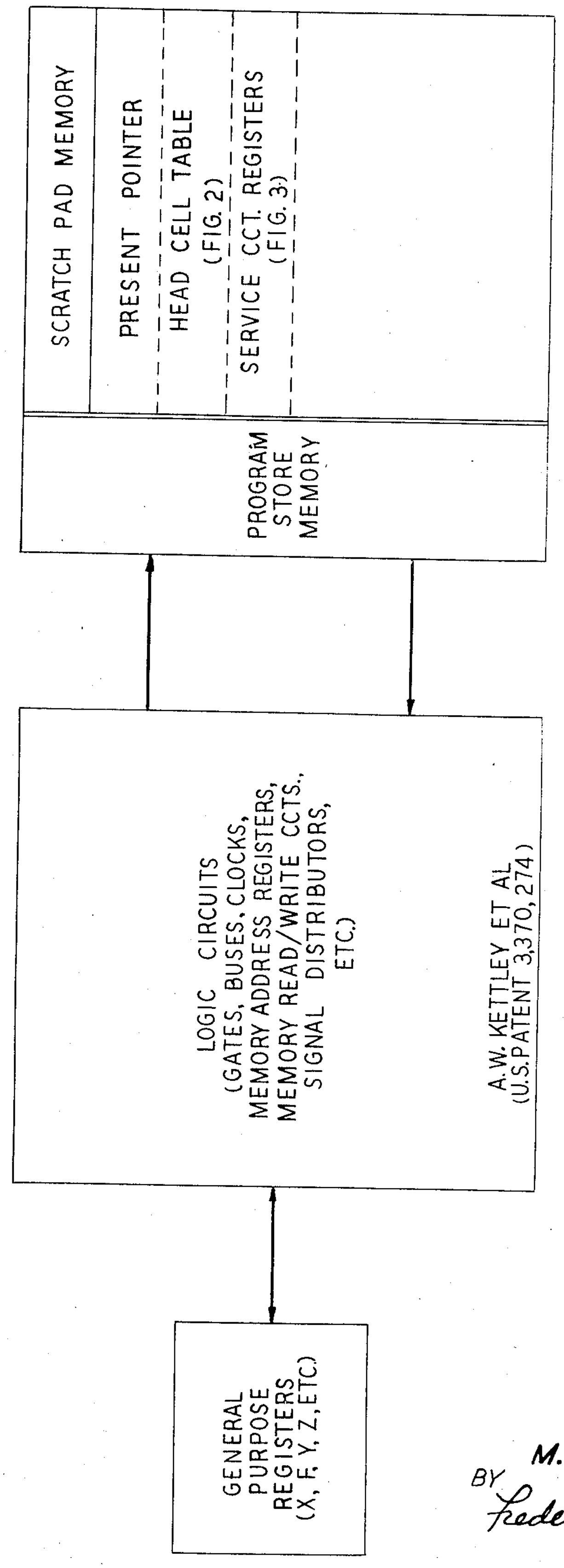
FIG. 1 depicts an illustrative stored program processor embodying principles of this invention.

The processor shown in FIG. 1 is illustratively of the type described in U.S. Pat. No. 3,370,274, which issued on Feb. 20, 1968 to A. W. Kettley et al. This processor will be used to illustrate the principles of this invention, but other processors also may be utilized in applying my teaching. The details of the operation of the internal logic of the processor depicted in FIG. 1 will not be completely described herein since only a description of the overall operation of this processor as it relates to this invention is necessary for a complete understanding of this invention.

The processor shown in FIG. 1 may be considered as being divided into two major parts. The first part is a memory of the processor, which itself can be subdivided into the program store memory and the scratch pad memory. The program store memory contains the program instructions for controlling the operation of the processor. The scratch pad memory is a read/write memory in which are stored, under the control of the processor, data of a temporary or semipermanent nature. Portions of this scratch pad memory are permanently allocated for storing certain predetermined types of data. For example, a word at a fixed location is set aside as the present pointer, a block of memory is set aside as the head cell table, and specific words are set aside as parts of different service circuit registers.

The logic portion of the processor contains the hardware for controlling the system of which the processor is a part. This controlling takes place in accordance with the instructions stored in the program store memory in a manner as described in the aforementioned patent. The hardware includes the circuitry utilized to receive instructions from the program store memory and to read from and write into the scratch pad memory. It also includes logic gates, buses, clocks, signal distributors which are utilized to transmit enabling signals to the various circuits in the system of which the processor is a part, as well as all other hardware utilized for the operation of the processor. Part of this logic portion is a group of general purpose registers. These registers are not to be confused with the service circuit registers which are allocated portions of the scratch pad memory. The general purpose registers are hardware registers which are utilized by the processor temporarily to store intermediate results of calculations, to store program store addresses, etc.

Figure 2:
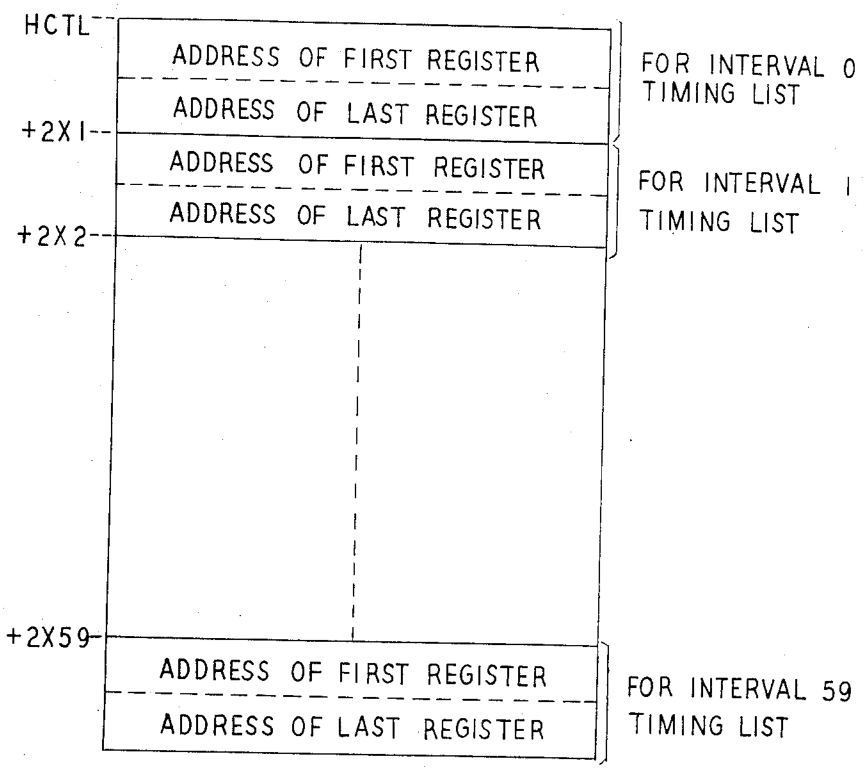
FIG. 2 discloses an illustrative head cell table of this invention in the memory of the processor.

Head Cell Table (FIG. 2)

Referring now to FIG. 2, the head cell table of this illustrative embodiment consists of a contiguous block of 120 words in the scratch pad memory. This block is divided into 60 two-word head cells. Each head cell defines a timing list for one of 60 timing intervals, referred to as interval 0 through interval 59. The first word of the head cell table is given the symbolic address Head Cell Table (HCTL). The head cell for a particular timing list is addressed by adding twice the interval number of that timing list to HCTL. For example, the head cell for interval 39 is addressed as HCTL+78. In each head cell, the first work contains the address of the first register on the timing list for that interval and the second word contains the address of the last register on the list. If the list is empty, i.e., there are no service circuits whose timing period is set to elapse during that interval, then both words of the head cell for that interval are set to a predetermined bit pattern which the processor recognizes as an indication that the list is empty.

As was previously mentioned, a single work is set aside in the scratch pad memory for use as the present pointer. This word contains a number between 0 and 59. The present pointer is controlled by the timing program, to be described later that respect to FIG. 4, and is utilized to index the head cell table. In order to index the head cell table, the contents of the present pointer word is doubled and added to HCTL.

Figure 3:
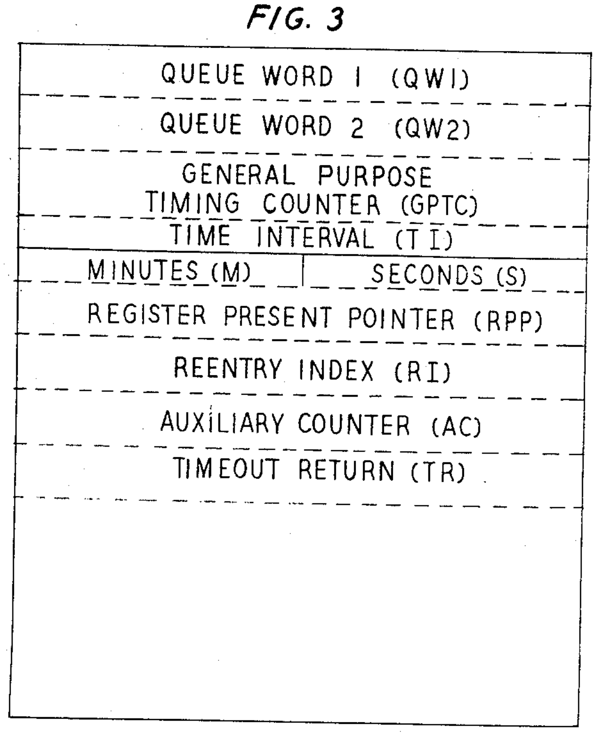
FIG. 3 shows an illustrative service circuit register wherein memory space is allocated in accordance with this invention.

Service Circuit Registers (FIG. 3)

Part of the scratch pad memory of the processor, FIG. 1, is set aside to be used for service circuit registers. These registers are utilized by the processor for storing data needed by the processor to administer tasks involving the particular circuits associated with these registers.

FIG. 3 shows, in a simplified form, the layout of a portion of a typical register. The shown portion is that part of the register which is applicable to this invention. When a register is placed on a list, one word of the register is used to store the memory address of the preceding register on the list. This word is referred to as Queue Word 1 (QW1). If a register is the first register on the list, then Queue Word 1 contains the address of the head cell for the list. Another work of the register, designated Queue Word 2 (QW2), is used to store the address of the succeeding register on the list. If a register is the last register on the list, Queue Word 2 contains the address of the head cell for the list. When a register is placed on a timing list by a task program, the number of times that the list is to be processed before the task program is to be notified is stored in a word of the register designated General Purpose Timing Counter (GPTC). The word in the register designated Time Interval (TI) is used by a task program which requires timing to store the length of time, Minutes (M) and Seconds (S), the register is to remain on the list. The word designated Register Present Pointer (RPP) stores the index to the head cell defining the list containing the register.

When a register is removed from a list before the required time has elapsed, it is necessary to keep a record of the unelapsed time which remains. This is accomplished by storing in the word designated Reentry Index (RI) the displacement between the head cell to which the register is linked and the head cell which would be processed next. This corresponds to remaining seconds. The word designated Auxiliary Counter (AC) is used in these circumstances to store the remaining minutes, which are obtained from GPTC. In the word designated Timeout Return (TR), a task program requesting timing stores the address of an instruction to which control is to be transferred when the register times out.

Detailed Description

The following discussion will be concerned with the flow charts shown in FIGS. 4 through 7. From these flow charts and a knowledge of the order structure of the processor to be used, a programmer skilled in the art will be able properly to code programs which will cause the processor to implement method steps in accordance with the principles of the present invention. In the ensuing discussion, references to the flow charts will be by identification numbers which appear in the drawing adjacent to each box of the flow charts.

Figure 4:
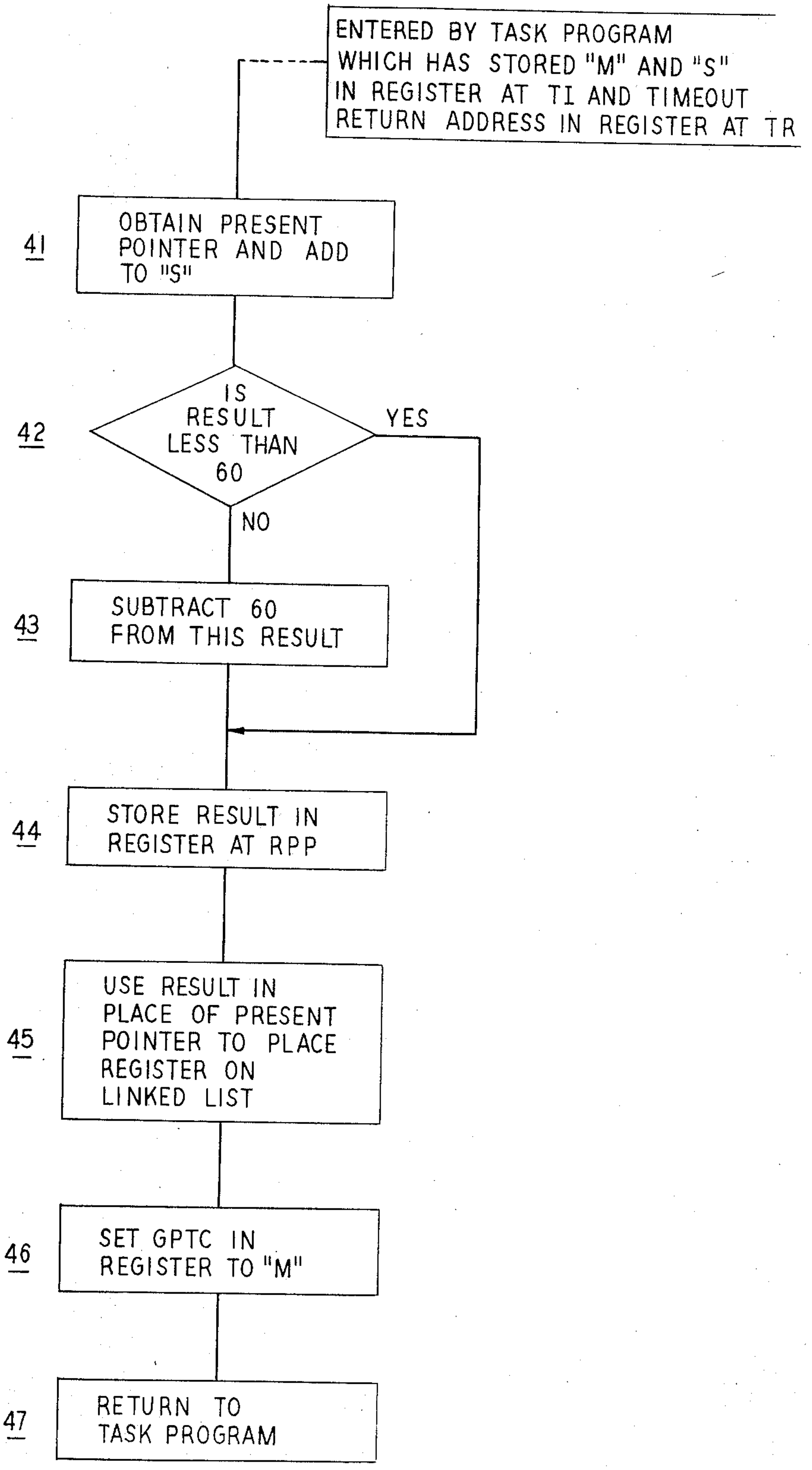
FIGS. 4 through 7 are functional flow charts of program routines stored in the program store memory of the processor which cause the processor to implement method steps in accordance with the principles of this invention.

Referring now to FIG. 4, a flow chart of a program routine which causes the processor to place a register on a timing list for a period of "M" minutes plus "S" seconds is shown. It is assumed that a task program which requires timing for this period has already stored "M" and "S" in the register at TI. Also, the address of the instruction to which control is to be transferred when the register times out is stored in the register at TR. The program shown in FIG. 4 is entered by means of a transfer instruction in the task program. Illustratively, the X-register of the processor is utilized to store the task program return address. This is the address of the instruction in the task program to which control of the processor is transferred after the register is placed on a timing list.

The present pointer is obtained and its contents at that time is added to "S", 41. This sum is calculated on a modulo-60 basis, 42, 43. The result of this calculation is stored in the register at RPP, 44, and is used to index the head cell table to determine on which list the register is to be placed. The register is placed on that list in accordance with well known programming techniques, 45. This is done by changing the address stored in the second word of the head cell, FIG. 2, for that list to the address of the register added to the list. In QW2 of the register which previously was the last register on the list, there is now stored the address of the added register, and QW1 and QW2 of the added register are set to the address of the previous last register and the head cell, respectively. In GPTC counter word of the added register, "M" is stored, 46, and then control of the processor is returned to the task program instruction whose address is stored in the X-register, 47.

Figure 5:
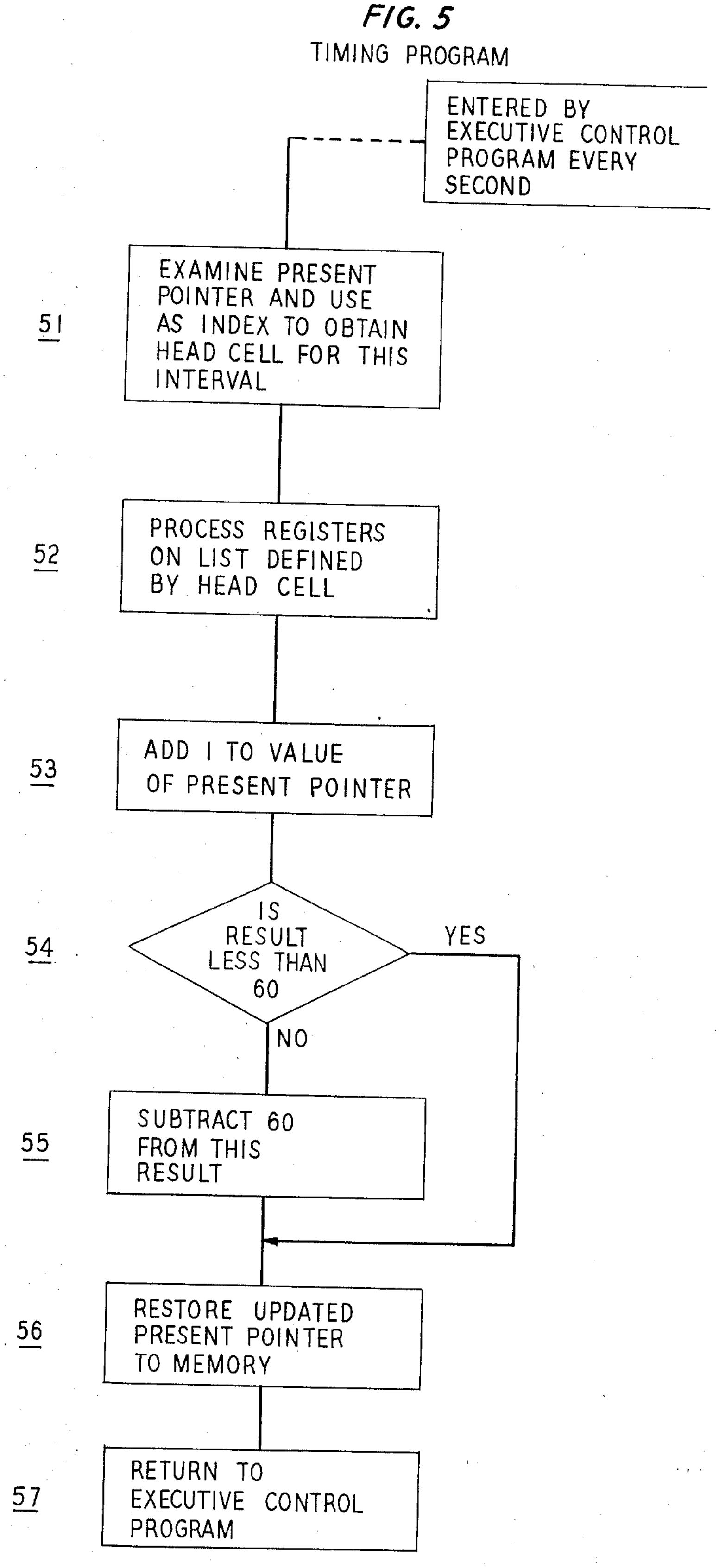

FIG. 5 shows a flow chart of a timing program to which control of the processor is transferred once every second by the executive control program of the processor. The function of this timing program is to maintain the present pointer and to examine the registers for time-out. The timing program first examines the present pointer and uses its value to index the head cell table to obtain the head cell defining the timing list for this 1-second interval, 51. It then processes all the registers on the list defined by this head cell, 52. This processing is a well-known technique and involves examining GPTC in each register linked to the head cell to determine whether or not it is zero. If GPTC for a register is zero, this indicates that the register has been on the list for the allotted time. The timing program then transfers control of the processor to the instruction at the address stored in the register at TR and stores its own return address in the X-register. After necessary updating is performed for the timed-out register by the program routine to which control has been transferred, control is returned to the timing program at the address stored in the X-register so that the timing program can continue processing the timing list. The aforementioned updating includes removing the timed-out register from the timing list. This removal is accomplished in accordance with well-known programming techniques by erasing the addresses stored in QW1 and QW2 of the timed-out register and changing the contents of QW2 of the preceding register and QW1 of the succeeding register on the list, or the corresponding words in the head cell if the timed-out register was first or last on the list, so that there is a complete linking of the list without the timed-out register. If GPTC is not zero, the timing program decrements its value by one. After all the registers on the list have been processed in the above-described manner, the timing program adds one to the value of the present pointer, 53. This addition is done modulo-60, 54, 55. After this calculation, the updated value of the present pointer is restored to memory, 56, and the timing program transfers control of the processor to the executive control program, 57.

Figure 6:
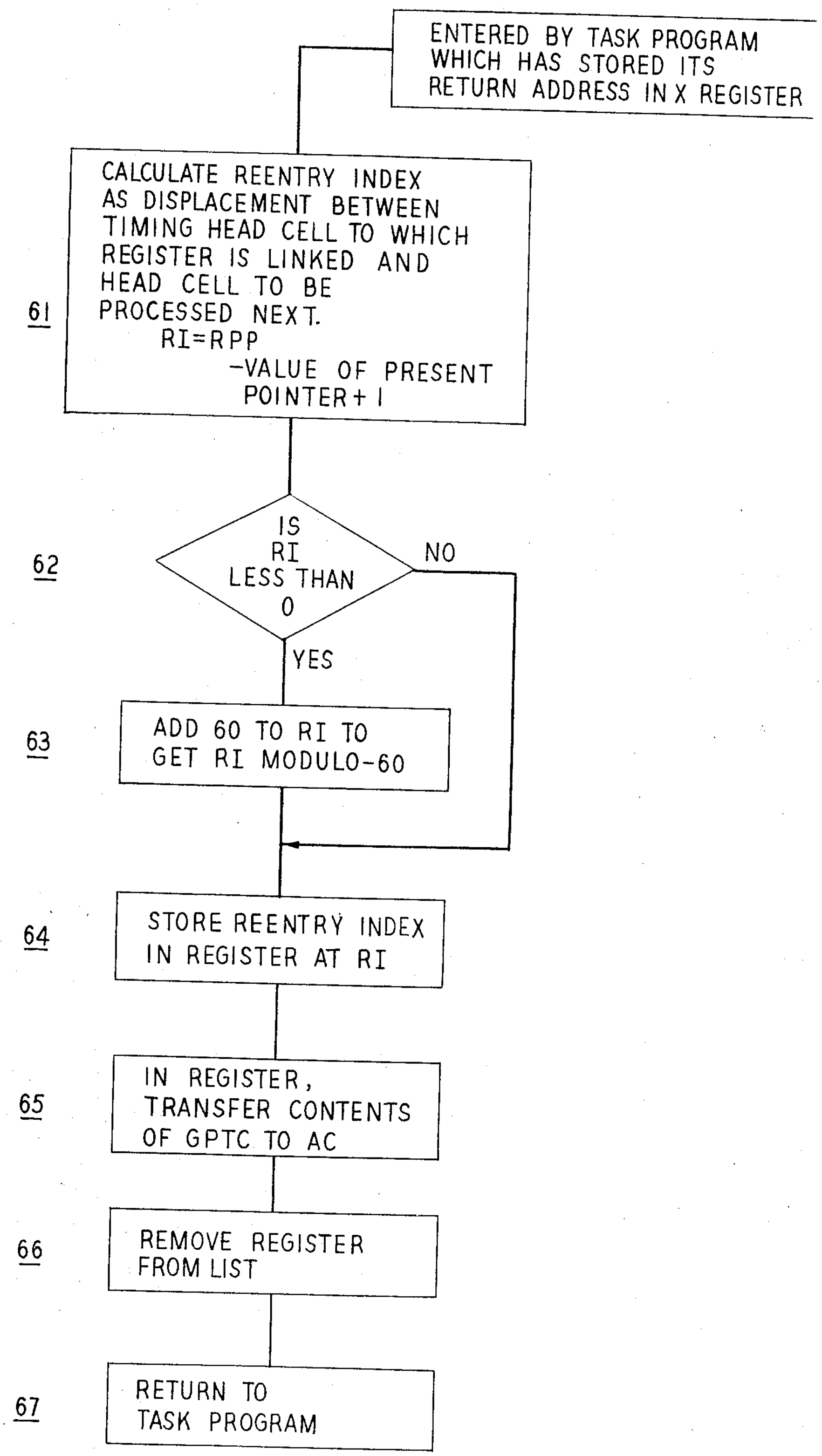

In FIG. 6 is shown a flow chart of a program routine which removes a circuit register from the timing list on which it had previously been placed and saves the remaining time for that register. This occurs, illustratively, when a customer on a coin call flashes the switchhook during the call to request operator assistance. The program of FIG. 6 is entered by a task program which has stored its return address in the X-register. The first step in this program is to calculate the displacement between the head cell to which the register is linked and the head cell to be processed next, 61. The result of this calculation is stored in the register at RI, 64. It is referred to as the reentry index and indicates remaining seconds. Note that, as in all other calculations, the reentry index is calculated modulo-60, 62,63. In the register, the contents of GPTC are transferred to AC, this being the remaining minutes, 65. The register is then removed from the linked list, 66, in a manner well known to a skilled programmer and control is returned to the task program at the instruction address stored in the X-register, 67.

Figure 7:
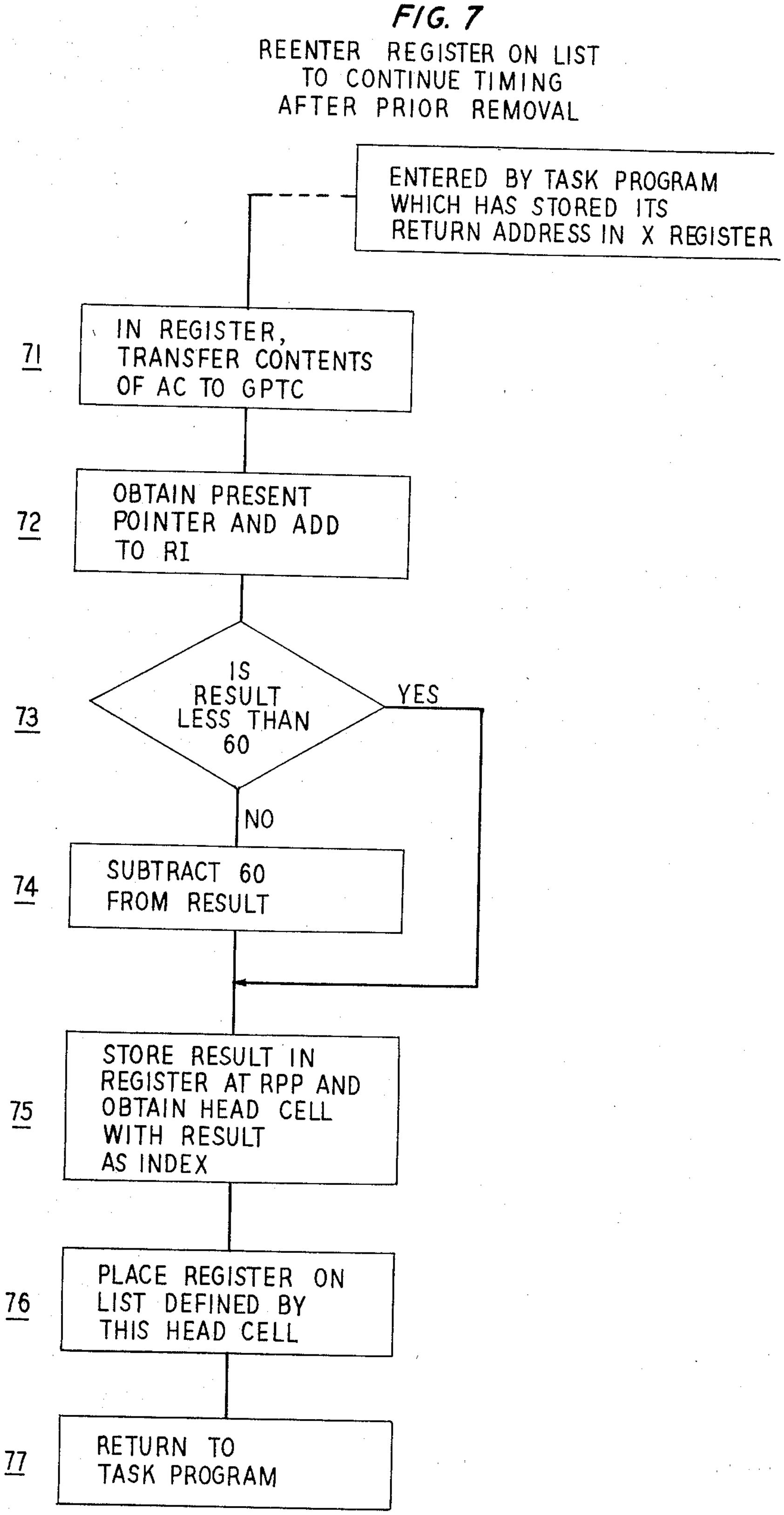

FIG. 7 shows a flow chart of a program which places a register on a list to continue timing which had previously been interrupted. This program is entered by a task program which has stored its return address in the X-register after, for example, an operator has furnished assistance to a coin customer. In the circuit register, the contents of AC are transferred to GPTC, 71. The present pointer is obtained and its contents are added, modulo-60, to the contents of RI in the register, 72, 73, 74. This result is stored in the register at RPP and is used to index the head cell table to determine which head cell defines the list on which the register is to be placed, 75. The register is placed on this linked list, 76, in the same manner as was described in the prior discussion of FIG. 4. Control is then returned to the task program at the address stored in the X-register, 77.

The above discussion has illustratively referred to an arrangement utilizing 60 timing lists. It is to be understood that any number of timing lists can be used and the timing program can be activated at any desired interval.

Accordingly, a method has been shown whereby accurate long and short period timing may be achieved, both with and without interruption, in a stored program controlled real-time processing system. This method may be utilized in a processor which controls a telephone-switching center, an automated manufacturing plant, or any other stored program controlled real-time processing system, without departing from the spirit and scope of my invention.

What is claimed is:

1. A method for controlling apparatus in a real-time processing system to time system operations, wherein a portion of the memory of the system includes a plurality of timing lists and a pointer undated at predetermined equal time intervals for identifying the next list to be processed, and wherein a system operation requires a prescribed time interval for performance, comprising the apparatus steps of defining a one of said lists to be processed at the termination of said prescribed time interval, commencing timing of said operation by storing an identification of said operation in the defined list, determining the list to be processed by examining said pointer, processing said determined list to recognize said stored identification until the expiration of said prescribed interval, and updating said pointer after said processing for identifying a succeeding one of said lists, said determining, processing, and updating steps being successively repeated at said predetermined equal time intervals.

2. The method in accordance with claim 1, wherein timing of said operation is suspended during a repetition of said determining, processing, and updating steps, comprising the further apparatus steps of calculating the remaining portion of said prescribed interval for said operation, storing a representation of said calculated portion of said prescribed interval, and suspending timing for said operation by removing said identification of said operation from the defined list after said storing of said representation.

3. The method in accordance with claim 2, wherein timing of said operation is recommenced after said suspension, comprising the further apparatus steps of retrieving said representation of said calculated portion of said prescribed interval, ascertaining a particular one of said lists to be processed at the termination of said calculated portion of said prescribed interval, and recommencing timing of said operation by again storing said identification of said operation in the ascertained list, said determining, processing, and updating steps being successively repeated at said predetermined equal time intervals after said identification is again stored.

4. In a system having a plurality of service circuits and a stored program processor including a memory for supervising the operation of said system, wherein a portion of said processor memory is allocated for a plurality of service circuit registers corresponding to said service circuits, a plurality of head cells, each identifying a timing list of said registers, and a word updated at predetermined equal time intervals to identify the head cell of the next list to be processed, a method for controlling apparatus to mark said memory to enable said processor to time an operation of a given service circuit in accordance with a timing request specifying a time interval, comprising the apparatus steps of storing time interval data in the register corresponding to said given service circuit in accordance with said timing request, determining the next list to be processed by examining said word after said storing, defining, after said determining, in accordance with said time interval data and the determined list, a one of said lists to be processed at the end of said specified time interval, commencing timing of said specified time interval for said operation of said given service circuit by inserting said register corresponding to said given service circuit in the defined list, ascertaining the next list to be processed by examining the head cell identified by said word, processing the registers on the ascertained list to recognize the expiration of said specified time interval for said register on the defined list, and updating the contents of said word after said processing to identify a succeeding one of said head cells, said ascertaining, processing, and updating steps being successively repeated at said predetermined equal time intervals.

5. The method in accordance with claim 4, recognize said register corresponding to said given service circuit is removed from said defined list to suspend timing for said register corresponding to said given service circuit during a repetition of said ascertaining, processing, and updating steps, comprising the further apparatus steps of calculating the remaining portion of said specified time interval for said register corresponding to said given service circuit from the contents of said word, an identification of said defined list and said specified time interval data in said register corresponding to said given service circuit, storing a representation of said calculated portion of said specified time interval in said register corresponding to said given service circuit, and suspending timing for said register corresponding to said given service circuit by removing said register corresponding to said given service circuit from said defined list after the immediately preceding step of storing.

6. The method in accordance with claim 5, wherein timing is recommenced for said register corresponding to said given service circuit after said suspension, comprising the further apparatus steps of storing said representation of said calculated portion of said specified time interval in said register corresponding to said given service circuit as time interval data, and specifying a particular one of said lists to be processed at the termination of said calculated portion of said specified time interval, recommencing timing for said register corresponding to said given service circuit by again inserting said register corresponding to said given service circuit in said specified list, said ascertaining, processing, and updating steps being successively repeated at said predetermined equal time interval after said register corresponding to said given service circuit is again inserted in a list.

7. In a real-time processing system having a plurality of service circuits and a stored program processor including a memory for supervising the operation of said system, wherein a portion of the processor memory is allocated for a plurality of service circuit register corresponding to said service circuits, 60 head cells, each specifying a timing list of said registers, and a modulo-60 counter advanced at one-second intervals for identifying the head cell of the next list to be processed, a method for controlling apparatus to mark said memory to enable said processor to time an operation of a given service circuit in accordance with a timing request specifying a time interval in minutes and seconds, comprising the apparatus steps of storing in the register corresponding to said given service circuit a representation of said specified minutes, adding the contents of said counter to said specified seconds after said storing, identifying one of said head cells in accordance with the result of the preceding step of adding, inserting said register corresponding to said given service circuit in the list defined by said one cell, determining the next list to be processed by examining the head cell identified by said counter, processing the registers on the determined list to recognize the expiration of the specified minutes for said register on the list defined by said one head cell, and advancing said counter after said processing to identify a succeeding one of said head cells, said determining, processing, and advancing steps being successively repeated at one-second intervals.

* * * * *